UNITED STATES PATENT OFFICE.

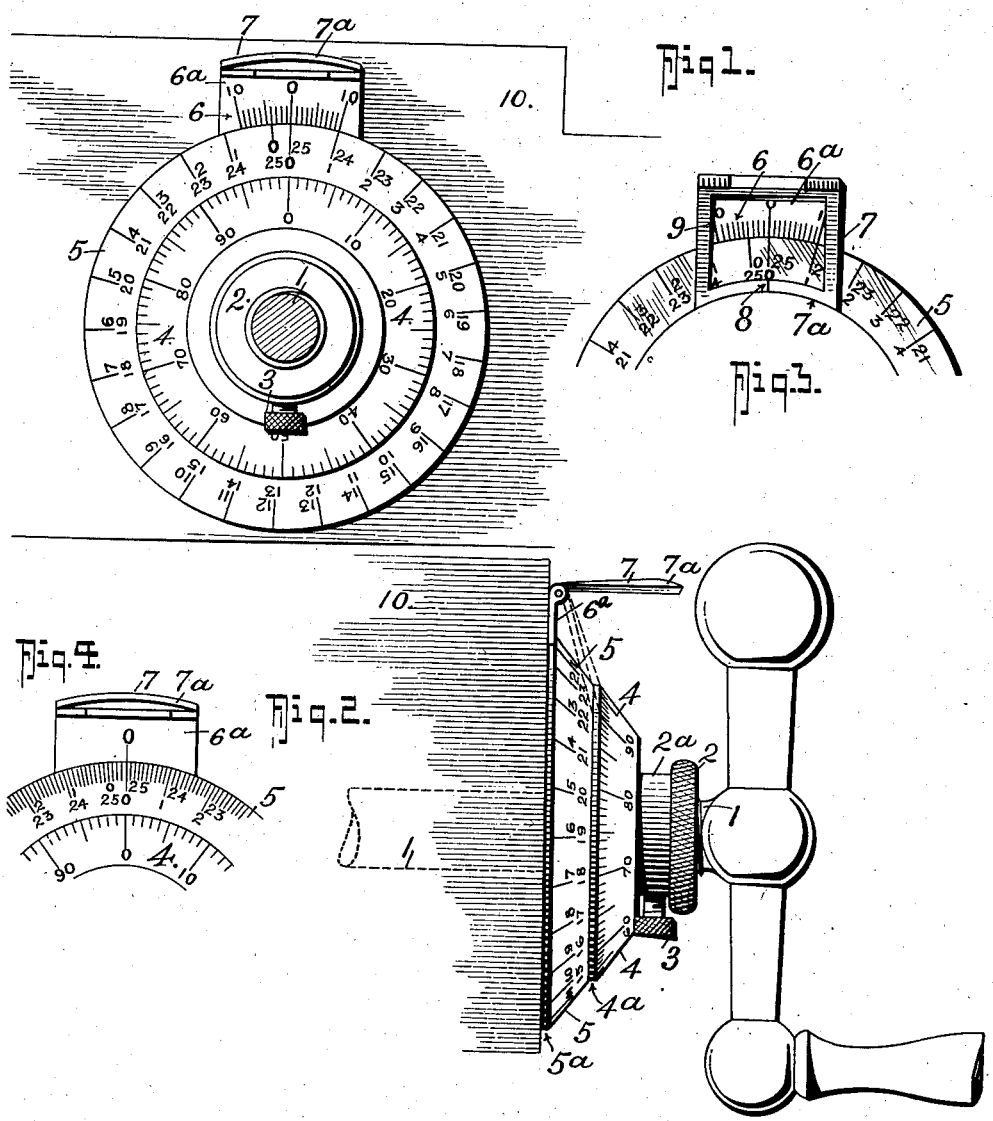

MAX KRONERT, OF BOZEMAN, MONTANA.

MICROMETER-FEED MECHANISM.

1,027,549.  Specification of Letters Patent.   Patented May 28, 1912.

Application filed February 14, 1910. Serial No. 543,716.

*To all whom it may concern:*

Be it known that I, MAX KRONERT, a subject of the Emperor of Germany, who have taken out my first papers for citizenship in the United States, at present residing at Bozeman, in the county of Gallatin and State of Montana, have invented certain new and useful Improvements in Micrometer-Feed Mechanisms; of which the following is a specification.

My invention is a micrometer adjusting mechanism for use on lathes, milling machines, planers, grinders, etc., and the invention generically resides in providing the adjustable feed nut or screw with a double gage plate, one section of which is graduated in one hundredth divisions while the other is graduated in 25.4 parts, each of which parts may be sub-divided into ten sub-divisions by a fixedly held vernier scale so that the adjustments made may be read off in both the English system of measure or in the metric system. To render this dual reading quick and easy the vernier scale plate has a member which has a single zero indicating mark to coöperate with one of the scales, while the vernier coöperates with the other.

The invention also resides in those novel details of construction, combination and arrangement of parts, all of which will be first described in detail, then be specifically pointed out in the appended claim, and illustrated in the accompanying drawings, in which:—

Figure 1, is a face view of the scales in one form of the invention showing the graduations and hinged zero indicator for the "inch" scale, swung up to expose the vernier for the "metric" scale. Fig. 2, is a side elevation thereof. Fig. 3, is a detail view of a modification of the hinged indicator. Fig. 4, is a detail view showing a modified way of graduating the scale 5.

In the drawings in which like letters and numerals of reference indicate like parts in all of the figures, 1 is the feed or adjusting screw of a machine of any type employing micrometer adjustments, and 2 is the micrometer member which has rotary movement, and which may be clamped to the screw 1 by a set screw 3. On the nut sleeve 2 is a plate having a pair of bevel-faced gage ring portions 4 and 5 which is fixed and turns with and as a part of the sleeve 2. The sleeve 2 has a milled finger engaging portion 2ª. The smaller ring portion 4 is graduated into one hundred divisions to represent thousands of an inch (the screw 1 being of a pitch of ten threads to the inch) while the scale 5 is sub-divided into 25.4 parts, the corresponding metric divisions to the inch graduations of the scale 4. Each division of the scale 5 is further sub-divided into ten parts by a vernier scale 6 on a plate 6ª fixed to the frame 10 of the machine.

Hinged to the scale plate 6ª is an indicator plate 7 having a single zero mark 8 to co-act with the scale 4. The scale ring 4 has a flat circumferential edge 4ª against which the bevel edge 7ª of the plate 7 rests (see dotted lines in Fig. 2) when readings of the scale 4 are taken and which may be swung up out of the way (see full lines in Fig. 2) when the scale 5 and its vernier are to be read. The ring 5 also has an annular surface 5ª to permit the vernier plate to abut the same, as shown. The indicator plate 7 may be cut out as at 9 so that both scales may be used simultaneously, as shown in Fig. 3.

The graduating marks on the scale 5 are indicated by two sets of numerals, one set running in a clockwise direction and the other set in a counter clockwise direction, as clearly shown in the drawings, so that readings forward or backward may be had with equal facility.

In operation after the approximate adjustment is made, through the medium of the screw 1, in the usual manner, the accurate adjustments are made by turning the nut sleeve 2, as with the micrometer mechanism now in use. If the sleeve 2 is turned until say, one division on the scale 4 is indicated, the screw will be advanced one one-thousandths of an inch, when the screw 1 is of a pitch of ten threads per inch. The corresponding reading on the scale 5 will then be 2.54 thousandths millimeters, and so on. By sub-dividing each of the divisions of the scale 5 into ten parts, as indicated in Fig. 4, the vernier graduations may be omitted and only a single zero indicating mark used on the plate 6ª. When the pitch of the feed screw is more than ten threads per inch the number of divisions on the scales 4 and 5 are decreased in proportion to the increase in the number of threads. For example, if the pitch of the screw 1 is 20 threads per inch there will be 50 divisions on the scale 4 and there will be but 12.7 divisions on the scale 5 and so on. The number of divisions on the scales 4 and 5 bear a fixed relation to the pitches of the threads of the screw 1 as will be readily understood by those skilled in the art. Again, for example, should the screw 1 have but five threads to the inch then the number of divisions on the scales 4 and 5 will be doubled instead of halved as when the pitch of the threads of the screw 1 are doubles.

On large machines where the diameter of the rings 4 and 5 is great enough the sub-divisions of graduations may be placed on the ring 5 but the vernier graduations omitted, but on smaller machines the construction shown in Figs. 1 to 3 of the drawings is preferred.

From the foregoing description taken in connection with the accompanying drawings, the complete construction, operation and advantages of my invention will be readily understood by those skilled in the art to which the invention appertains. I desire to say, however, that I do not wish to confine the use of my invention to any specific machine and that slight modifications may be made to adapt it for use on any machine where micrometer adjustments are required.

What I claim is:—

In a device of the character described, a micrometer screw, a micrometer member mounted on said screw and including a collar and a scale plate having two distinct concentric scale sections, one of said sections being of greater diameter than the other, a fixed vernier mounted adjacent to the scale plate section of greater diameter, a hinged member hinged to said vernier plate to swing over the same and over the larger section of said scale plate, said scale plate having an annular shoulder between the two sections on which the free edge of said hinged member rests, said hinged member having an opening to expose said vernier plate and the coöperating part of said scale plate, said hinged member having a zero mark to coöperate with said scale plate section of lesser diameter, one of said scale plate sections being graduated according to the English system, and the other of said scale plate sections being graduated according to the metric system.

MAX KRONERT.

Witnesses:
 W. C. GLAWE,
 AUG. RICHTER.